United States Patent [19]

Marriott et al.

[11] Patent Number: 5,715,600
[45] Date of Patent: Feb. 10, 1998

[54] BEARING CAP INSTALLATION AND ALIGNMENT TOOL FOR UNIVERSAL JOINT

[75] Inventors: Thomas J. Marriott, Temperance, Mich.; Steven L. Ingalsbe, Toledo, Ohio

[73] Assignee: Dana Corporation, Toledo, Ohio

[21] Appl. No.: 549,334

[22] Filed: Oct. 27, 1995

[51] Int. Cl.$^6$ .................................................. F16D 1/00
[52] U.S. Cl. ........................... 29/898.07; 29/898.09; 464/128; 464/130; 403/19; 403/13
[58] Field of Search ............... 29/898.07, 898.09, 29/464, 466, 468; 403/11, 19, 13, 273; 464/128, 130, 134

[56] References Cited

U.S. PATENT DOCUMENTS

| | | |
|---|---|---|
| 438,801 | 10/1890 | Delehanty . |
| 506,531 | 10/1893 | McManus et al. . |
| 768,200 | 8/1904 | Speirs et al. . |
| 811,925 | 2/1906 | Jackson . |
| 1,538,413 | 5/1925 | Stafford . |
| 1,989,832 | 2/1935 | Swenson ............... 64/102 |
| 2,114,861 | 4/1938 | Slaught ............... 64/17 |
| 2,291,436 | 7/1942 | Anderson . |
| 2,698,527 | 1/1955 | Anderson ............... 64/17 |
| 3,083,449 | 4/1963 | Simmons . |
| 3,429,021 | 2/1969 | Spiess . |
| 3,492,841 | 2/1970 | Ipri . |
| 4,343,075 | 8/1982 | Guptill et al. ............... 29/251 |
| 4,790,079 | 12/1988 | Meyers ............... 33/517 |
| 5,033,501 | 7/1991 | Stehling ............... 403/19 |
| 5,038,449 | 8/1991 | Huggins, Jr. . |
| 5,376,051 | 12/1994 | Valencic ............... 464/130 |

FOREIGN PATENT DOCUMENTS 166717  9/1984  Japan .

*Primary Examiner*—L. I. Schwartz
*Assistant Examiner*—Marc W. Butler
*Attorney, Agent, or Firm*—MacMillan, Sobanski & Todd

[57] ABSTRACT

A tool for installing and aligning a bearing cap in a universal joint so as to position an end surface of the bearing cap a predetermined distance above the outer surface of the arm of the end yoke is generally cup-shaped, including a generally flat, circular end portion having a hollow cylindrical skirt portion. The skirt portion defines an inner diameter which is slightly larger than the outer diameter of the bearing cap. The skirt portion also defines an axial length which is equal to the desired predetermined distance. A cut-out may be formed in a portion of the tool to receive a spring tab or other axial retaining structure for the bearing cap. Also, one or more apertures may be formed in the end portion of the tool to receive anti-rotation protrusions formed on the end surface of the bearing cap. The universal joint is assembled by initially disposing the tool over the end surface of the bearing cap such that the inner surface of the end portion abuts the outer end surface of the bearing cap. A press is then used to exert a force against the outer surface of the end portion of the tool, urging it and the bearing cap axially inwardly such that the bearing cap is moved over the end of the trunnion until the open end of the skirt portion of the tool engages the outer surface of the yoke arm. The axial length from the inner surface of the end portion of the tool to the end of the skirt portion is sized to be equal to the desired axial distance by which the end surface of the bearing cap extends beyond the outer surface of the yoke arm. The tool provides a quick and easy method for installing the bearing cap on the trunnion and simultaneously aligning such bearings cap at a predetermined location relative to the outer surface of the yoke arm.

12 Claims, 5 Drawing Sheets

BEARING CAP INSTALLATION AND ALIGNMENT TOOL FOR UNIVERSAL JOINT

BACKGROUND OF THE INVENTION

This invention relates in general to universal joints for vehicle drive train systems. More specifically, this invention relates to a tool for installing and aligning the bearing caps in such a universal joint.

Universal joints are well known devices which provide a driving connection between two members adapted to rotate about non-aligned axes of rotation. Universal joints are widely used between rotatable drive shaft sections in vehicle drive train systems. A typical universal joint includes a cross having a central body portion with four cylindrical trunnions extending outwardly therefrom. The trunnions are oriented in a single plane and extend at right angles relative to one another. A hollow cylindrical bearing cap is mounted on the end of each of the trunnions. Needle bearings or similar means are provided between the outer cylindrical surfaces of the trunnions and the inner cylindrical surfaces of the bearing caps to facilitate relatively low friction rotational movement therebetween. The bearing caps which are mounted on a first opposed pair of the trunnions are connected to a first end yoke which, in turn, is secured to an end of a first drive shaft section or other component of the vehicle drive train system. Similarly, the bearing caps mounted on a second opposed pair of the trunnions are connected to a second end yoke which, in turn, is secured to an end of a first drive shaft section or other component of the vehicle drive train system.

A full round end yoke is one type of end yoke which is commonly used with a universal joint. A typical full round end yoke includes a body portion having a pair of opposed yoke arms extending therefrom. Each of the opposed yoke arms has a cylindrical opening formed in the end thereof. The two openings are co-axially aligned with one another, each extending between an outer surface and an inner surface of the associated yoke arm. To assemble the universal joint, two of the opposed trunnions of the universal joint cross (having no bearing caps mounted thereon) are initially inserted within the two openings formed through the yoke arms. Then, the bearing caps are moved axially inwardly through the openings from the outer surfaces of the yoke arms toward the inner surfaces thereof. In this manner, the bearing caps are installed over the ends of the opposed trunnions in the openings formed through the yoke arms.

In the past, the bearing caps have been installed on the ends of the trunnions by moving them axially inwardly until the end surfaces of the bearing caps were flush with the outer surfaces of the yoke arms. Bearing plates were then typically bolted across the flush end surfaces to retain the bearing caps. Alternatively, the bearing caps have been installed on the ends of the trunnions by moving them axially inwardly until the end surfaces of the bearing caps were slightly recessed below the outer surfaces of the yoke arms. Snap rings were inserted within grooves formed in the bores of the yoke arms to retain the bearing caps in this alternative structure.

More recently, it has been found desirable to reduce the overall size of the yoke arms and end yokes. To accomplish this, the outer surfaces of the yoke arms are machined or otherwise formed to define a distance therebetween which is somewhat smaller than the distance separating the opposed end surfaces of the two bearing caps mounted on the opposed trunnions. This reduction is size is desirable because less physical space is required for the end yoke to rotate during use. However, because the distance between the outer surfaces of the yoke arms is reduced, the end surfaces of the opposed bearing caps are no longer flush with or recessed below the outer surfaces of the yoke arms. Rather, the end surfaces of the opposed bearing caps extend upwardly beyond the outer surfaces of the yoke arms by a small, but nonetheless significant amount. To accommodate this, spring tabs and similar retainers are known for preventing the bearing caps from being removed from the universal joint during use despite the protruding nature of the bearing caps.

Unfortunately, it has been found that it is somewhat difficult to properly install the bearing caps on the trunnions and to align the end surfaces thereof so as to extend a precise predetermined distance beyond the outer surfaces of the yoke arms. The amount by which the end surfaces of the bearing caps extend beyond the outer surfaces of the yoke arms is important to insure that the spring tabs or other retainers can be properly installed. Also, because of the relatively tight frictional engagement of the bearing caps with the yoke arms, it is important to precisely install and align the bearing caps on the first attempt. It is difficult and time consuming to move improperly installed bearing caps after they have been pressed into the openings in the yoke arms. Thus, it would be desirable to provide a tool which facilitates the installation and alignment of the bearing caps in the yoke arms of end yokes. It would be further desirable to provide such a bearing cap installation and alignment tool which can accommodate bearing caps having one or more anti-rotation protrusions formed on the end surfaces thereof.

SUMMARY OF THE INVENTION

This invention relates to a tool for installing and aligning a bearing cap in a universal joint so as to properly position an end surface of the bearing cap a predetermined distance above the outer surface of the arm of the end yoke. The installation and alignment tool is generally cup-shaped, including a generally flat, circular end portion having a hollow cylindrical skirt portion extending generally perpendicularly therefrom. The skirt portion defines an inner diameter which is slightly larger than the outer diameter of the bearing cap. The skin portion also defines an axial length which is equal to the predetermined distance by which it is desired that the end surface of the bearing cap should extend beyond the outer surface of the arm of the end yoke. A cut-out may be formed in a portion of the installation and alignment tool to receive a spring tab or other axial retaining structure for the bearing cap. Also, one or more apertures may be formed in the end portion of the installation and alignment tool to receive anti-rotation protrusions formed on the end surface of the bearing cap. The universal joint is assembled by initially disposing the installation and alignment tool over the end surface of the bearing cap such that the inner surface of the end portion abuts the outer end surface of the bearing cap. A conventional press is then used to exert a force against the outer surface of the end portion of the installation and alignment tool, urging it and the bearing cap axially inwardly such that the bearing cap is moved over the end of the trunnion. Such axial movement continues until the open end of the skirt portion of the installation and alignment tool engages the outer surface of the yoke arm. At that point, further axial movement of the bearing cap is prevented. The axial length from the inner surface of the end portion of the installation and alignment tool to the end of the skirt portion is sized to be equal to the desired axial distance by which the end surface of the bearing cap extends beyond the outer surface of the yoke arm. Thus, the installation and alignment tool provides a quick and easy method for installing the bearing cap on the trunnion and simultaneously aligning such bearings cap at a predetermined location relative to the outer surface of the yoke arm.

Various objects and advantages of this invention will become apparent to those skilled in the art from the following detailed description of the preferred embodiment, when read in light of the accompanying drawings.

DETAILED DESCRIPTION OF THE PREFERRED EMBODIMENTS

Figure 1:
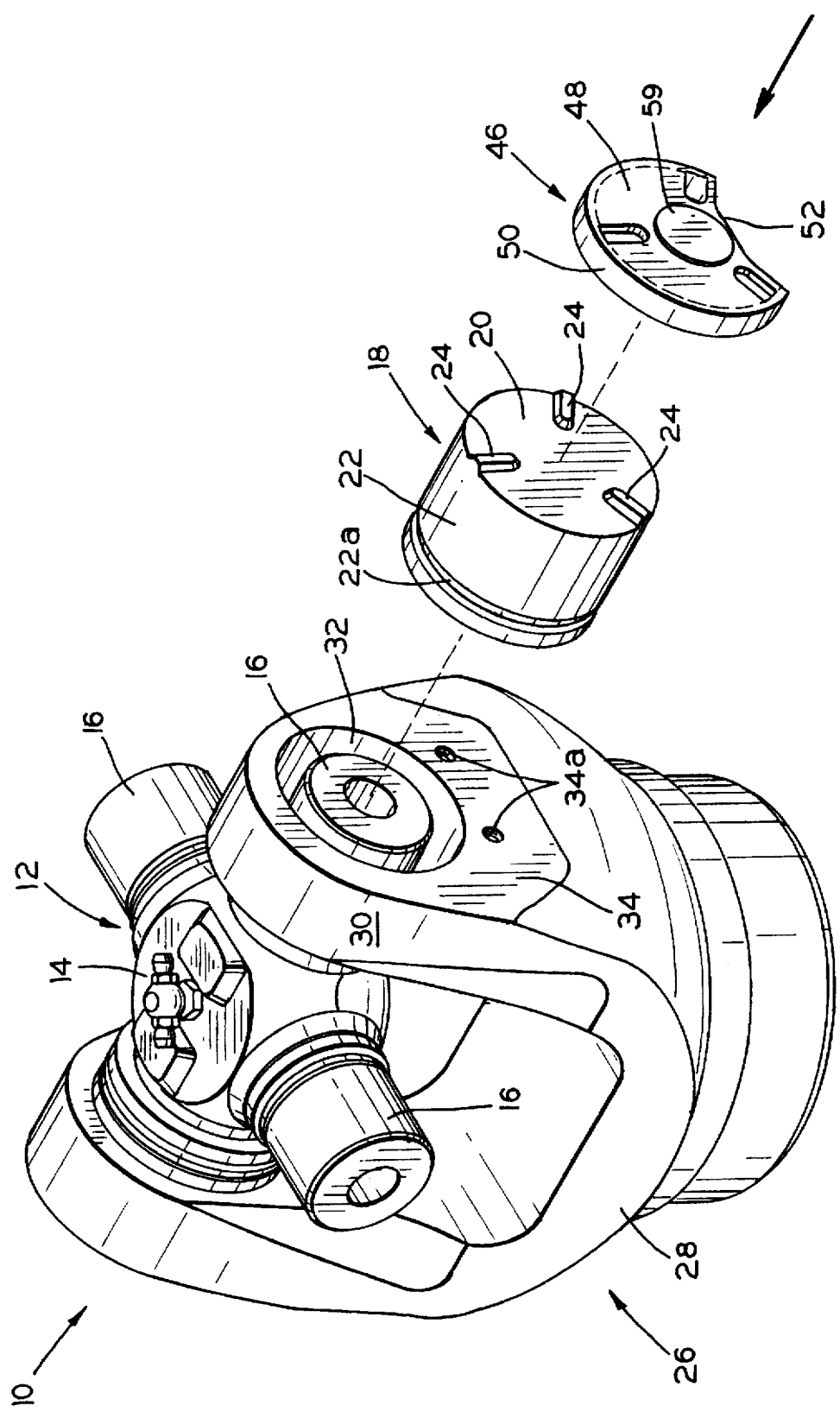
FIG. 1 is an exploded perspective view of a portion of a universal joint assembly including a full round end yoke, a cross having four trunnions, and a pair of bearing caps, wherein one of the bearing caps is shown prior to installation on its associated trunnion, and further including a first embodiment of a bearing cap installation and alignment tool in accordance with this invention.

Referring now to the drawings, there is illustrated in FIG. 1 an exploded perspective view of a portion of a universal joint assembly, indicated generally at 10. The universal joint assembly 10 includes a cross, indicated generally at 12, having a central body portion 14 and four cylindrical trunnions 16. The four trunnions 16 extend radially outwardly from the body portion 14 of the cross 12 in a common plane at right angles relative to one another. A bearing cap, indicated generally at 18, is mounted on the end of each of the opposed trunnions 16 of the cross 12. In the illustrated embodiment, only two of the bearing cap 18 are shown for clarity. Each of the bearing caps 18 is formed generally in the shape of a hollow cylinder, having a circular end surface 20 and a cylindrical skirt 22. An annular groove 22a is formed in the outer surface of the each skirt 22 to facilitate the attachment of a dust guard and lubricant seal assembly, indicated generally at 22b in FIG. 5, to the bearing cap 18.

A plurality of needle bearings 23 (see FIG. 5) or a similar bearing structure is provided between the outer surface of each of the trunnions 16 and the inner surface of each of the skirts 22 of the bearing caps 18. The needle bearings 23 are provided to permit relative rotational movement to occur between the bearing caps 18 and the trunnions 16 upon which they are mounted with relatively low friction. A plurality of protrusions 24 are formed on the end surface 20 of each of the bearing caps 18 for a purpose which will be explained below.

The universal joint assembly 10 illustrated in FIG. 1 also includes a full round end yoke, indicated generally at 26. The full round end yoke 26 includes a body portion 28 having a pair of opposed yoke arms 30 extending therefrom. Each of the opposed yoke arms 30 has a cylindrical opening 32 formed therethrough. The openings 32 are preferably co-axially aligned with one another. An outer surface 34 is defined about each of the openings 32. If desired, portions of such outer surface 34 are machined about each of the openings 32. A pair of threaded apertures 34a is formed in each of the yoke arms 30, extending inwardly from the outer surfaces 34 thereof. The purpose for the threaded apertures 34a will be explained below.

Figure 2:
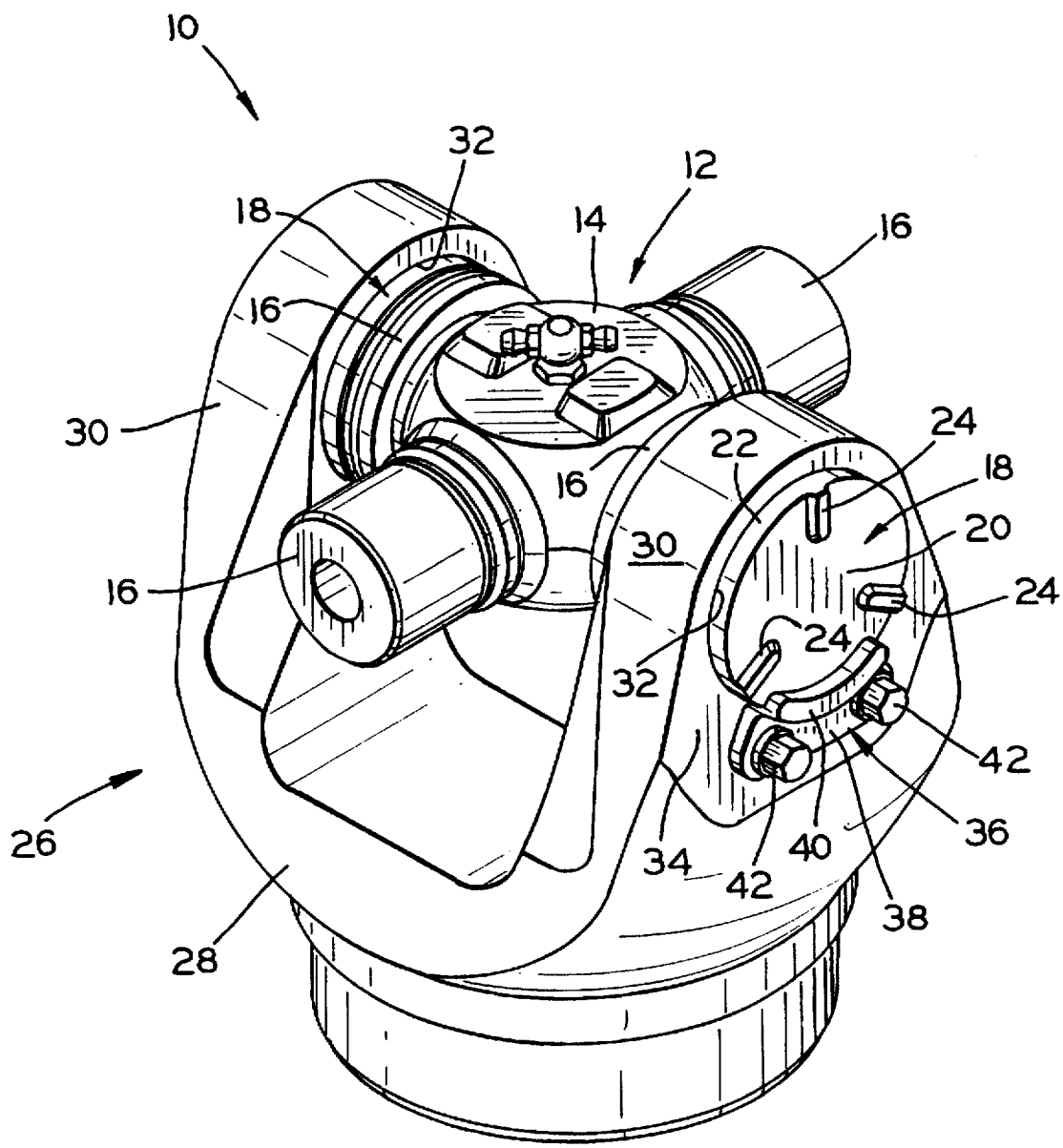
FIG. 2 is a perspective view of the universal joint assembly illustrated in FIG. 1 shown assembled.
Figure 3:
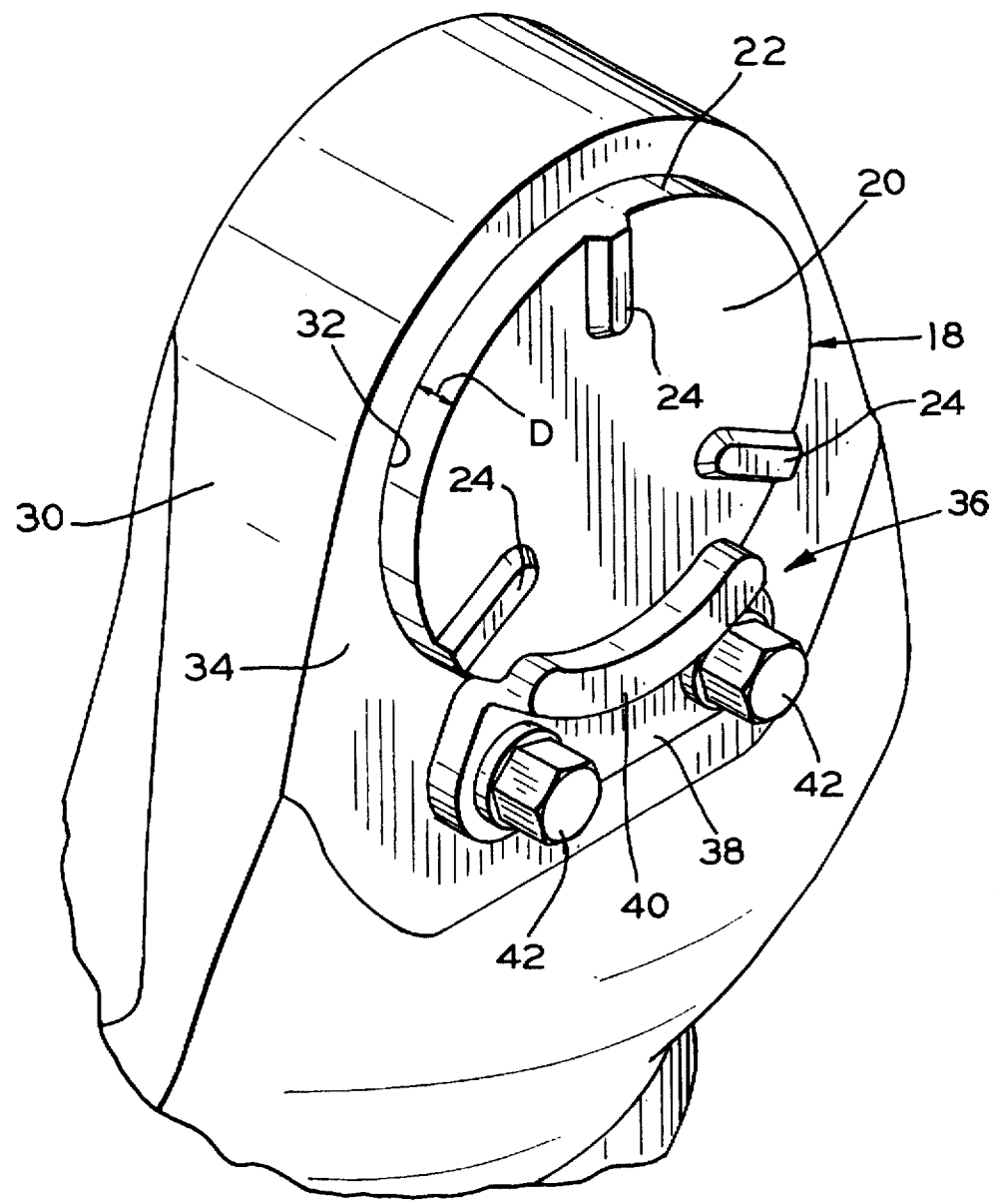
FIG. 3 is an enlarged perspective view of one of the yoke arms and bearing caps of the assembled universal joint assembly illustrated in FIG. 2.

To assemble the universal joint assembly 10, two opposed trunnions 16 of the cross 12 (having no bearing caps 18 mounted thereon) are initially inserted within the two openings 32 formed through the opposed yoke arms 30. Then, the bearing caps 18 are moved axially inwardly through the openings 32 from the outer surface 34 of the yoke arms 30 toward the body 14 of the cross 12, as shown by the arrow in FIG. 1. In this manner, the bearing caps 18 are installed over the ends of the opposed trunnions 16 in the openings 32 formed through the yoke arms 30, as shown in FIGS. 2 and 3. As mentioned above, a similar pair of bearing caps (not shown) can be mounted on the ends of the other two opposed trunnions 16 of the cross 12 in a similar manner. These other bearing caps are used to connect the cross 12 to a second end yoke (not shown) in a conventional manner.

A spring tab, indicated generally at 36, is provided for axially retaining each of the bearing caps 18 within the openings 32 formed through the end yoke 26. Each of the spring tabs 36 includes a base portion 38 and an end portion 40. The base portion 38 of the spring tab 36 is secured to the outer surface 34 of the yoke arm 30 by a pair of threaded fasteners 42 which extend into cooperation with the threaded apertures 34a formed in each of the yoke arms 30. The end portion 40 of the spring tab 36 extends over the end surface 20 of the bearing cap 18 to retain the bearing cap 18 within the opening 32. The end portion 40 of the spring tab 36 also cooperates with the protrusions 24 to prevent rotation of the bearing cap 18 relative to the end yoke 26 during operation.

As mentioned above, the bearing caps 18 are installed by moving them axially over the ends of the trunnions 16 to assemble the universal joint assembly 10. As best shown in FIG. 3, it can be seen that when the bearing cap 18 is inserted onto the trunnion 16, the end surface 20 of the bearing cap 18 is not flush with the outer surface 34 of the yoke arm 30. Rather, a portion of the closed end of the bearing cap 18 extends outwardly from the outer surface 34 of the yoke arm 30. The axial distance by which the end surface 20 of the bearing cap 18 extends beyond the outer surface 34 of the yoke arm 30 is indicated as a predetermined distance D in FIG. 3.

There are several reasons why it is desirable to have the closed end of the bearing cap 18 protrude this distance D from the outer surface 34 of the yoke arm 30. First, it is not necessary to extend the material of the yoke arm 30 to completely cover the bearing cap 18 because the bulk of the torque is transferred between the interior portions of the trunnion 16, the bearing cap 18, and the yoke arm 30. Second, by not providing this additional material, the overall weight of the yoke arm 30 is reduced. Third, by not providing this additional material, the outer dimensions of the yoke arm 30 are slightly reduced, allowing usage in smaller physical space within the vehicle.

Figure 7:
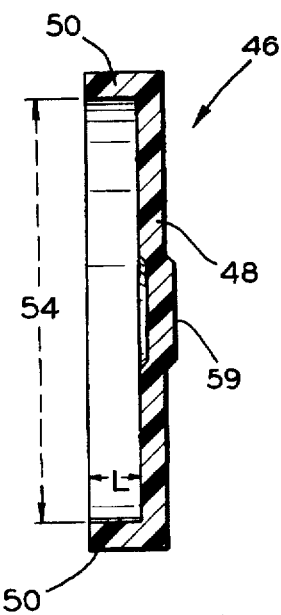
FIG. 7 is an enlarged sectional elevational view of the installation and alignment tool taken along line 7—7 of FIG. 6.

To facilitate the installation of the bearing cap 18 on the trunnion 16 and to align the end surface 20 relative to the outer surface 34 as described above, an installation and alignment tool, indicated generally at 46, is provided. The structure of the installation and alignment tool 46 best illustrated in FIGS. 4 and 5. As shown therein, the installation and alignment tool 46 is formed generally in the shape of a shallow cup including a generally circular end portion 48 and a generally cylindrical skirt portion 50 which extends generally perpendicularly from the end portion 48. Preferably, the skirt portion 50 is formed integrally with the end portion 48, such as from a single piece of molded plastic. Referring to FIG. 7, is can be seen that an inner diameter 54 is defined by the inner surface of the skirt portion 50 of the installation and alignment tool 46. Also, an axial length L is defined from the inner surface of the end portion 48 of the installation and alignment tool 46 to the open end of the skirt portion 50.

Figure 4:
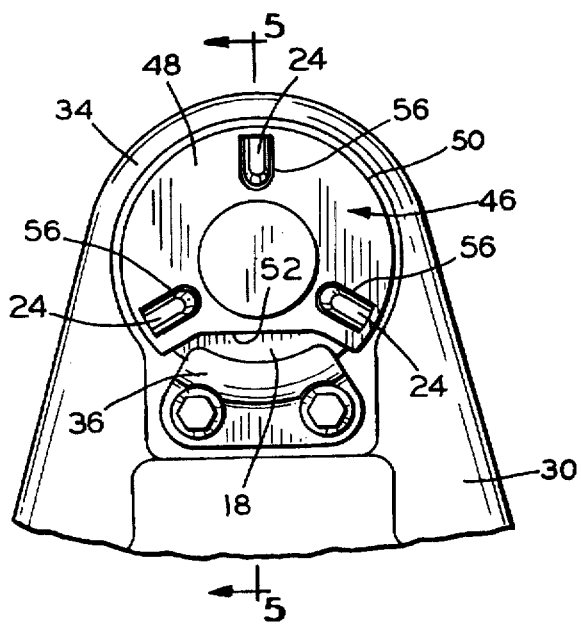
FIG. 4 is a top plan view of the yoke arm and bearing cap illustrated in FIG. 3, wherein the installation and alignment tool is shown positioned on the bearing cap.
Figure 5:
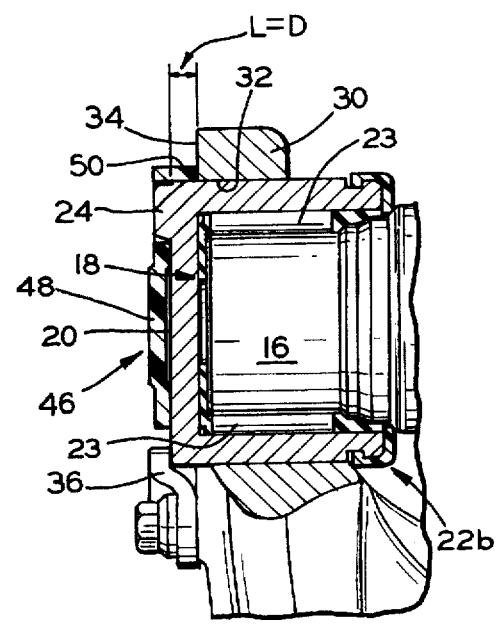
FIG. 5 is a sectional elevational view of the yoke arm, bearing cap, and installation and alignment tool taken along line 5—5 of FIG. 4.

A segment-shaped cut-out 52 is formed in the installation and alignment tool 46. The cut-out 52 is formed through portions of both the end portion 48 and the skirt portion 50 of the installation and alignment tool 46. The cut-out 52 is sized and shaped to receive the spring tab 36 therein, as best shown in FIG. 4. Thus, the size and shape of the cut-out 52 can vary with the size and shape of the spring tab 36. Typically, the cut-out 52 defines an angle from about 90° to about 150°, preferably about 120°. A plurality of apertures 56 are also formed through the end portion 48 of the installation and alignment tool 46. The apertures 56 are sized and shaped to receive the protrusions 24 formed on the end surface 20 of the bearing cap 18 therein, as best shown in FIGS. 4 and 5. Thus, the size and shape of the apertures 56 can vary with the size and shape of the protrusions 24.

Figure 6:
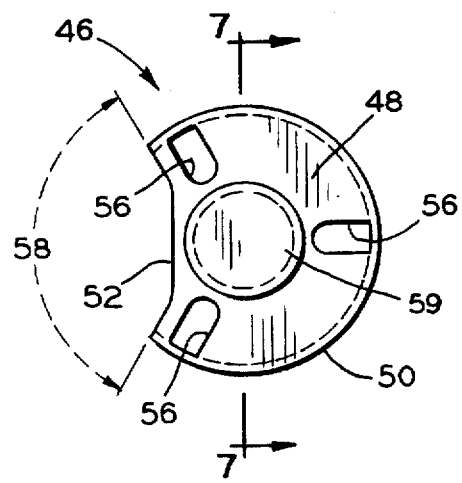
FIG. 6 is a top plan view of the bearing cap installation and alignment tool illustrated in FIGS. 1, 4, and 5.

As best shown in FIGS. 6 and 7, the skirt portion 50 defines an inner diameter 54 which is slightly larger than an outer diameter defined by the cylindrical skirt 22 of the bearing cap 18. In view of this, and further in view of the cut-out 52 and the apertures 56, the installation and alignment tool 46 can fit over the outer surface of the bearing cap 18 such that the inner surface of the end portion 48 of the installation and alignment tool 46 is flush with the outer surface of the end surface 20 of the bearing cap 18. The purpose for this will be explained below.

The installation of the bearing caps 18 on the trunnions 16 and the alignment of such bearings caps 18 with the outer surfaces 34 of the yoke arms 30 will now be explained. Initially, the installation and alignment tool 46 is disposed over the end surface 20 of the bearing cap 18 such that the inner surface of the end portion 48 abuts the outer end surface 20 of the bearing cap 18. Such abutment is made possible by the apertures 56 formed through the end portion 48 of the installation and alignment tool 46, which receive the protrusions 24 of the bearing cap 18 therein, as best shown in FIGS. 4 and 5. A conventional press (not shown) or similar tool is then used to exert a force against the outer surface of the end portion 48 of the installation and alignment tool 46. Such force urges the installation and alignment tool 46 and the bearing cap 18 axially inwardly (in the direction of the arrow shown in FIG. 1) such that the bearing cap 18 is moved over the end of the trunnion 16. Such axial movement continues until the open end of the skirt portion 50 of the installation and alignment tool 46 engages the outer surface 34 of the yoke arm 30, as shown in FIG. 5. At that point, further axial movement of the bearing cap 18 is prevented. The installation and alignment tool 46 is then removed, and the spring tab 36 is installed to provide the assembled universal joint 10 illustrated in FIGS. 2 and 3.

As mentioned above, an axial length L is defined from the inner surface of the end portion 48 of the installation and alignment tool 46 to the end of the skirt portion 50. The installation and alignment tool 46 is formed such that this axial length L is equal to the desired axial distance D by which the end surface 20 of the bearing cap 18 extends beyond the outer surface 34 of the yoke arm 30. Thus, use of the installation and alignment tool 46 in this manner provides a quick and easy method for installing the bearing cap 18 on the trunnion 16 and simultaneously aligning such bearings cap 18 with the outer surface 34 of the yoke arm 30. Because the axial length L determines the predetermined distance D, the installation and alignment tool 46 tool can be modified to have a different length L when a different predetermined distance D is desired. The cut-out 52 of the installation and alignment tool 46 allows the spring tab 36 to be positioned over the end surface 20 of the bearing cap 18 while the installation and alignment tool 46 is still positioned on the bearing cap 18.

If desired, the end portion 48 of the installation and alignment tool 46 can include a dimpled recess 59. The dimpled recess 59 is formed in the center of the end portion 48 and extends slightly outwardly from the inner and outer surfaces thereof. As a result, the dimpled recess 59 does not contact the outer end surface 20 of the bearing cap 18 during use. This reduction in the amount of contact surface makes the installation and alignment tool 46 easier to manufacture because precise tolerances do not have to be maintained over the entire inner surface of the end portion 48.

Figure 8:
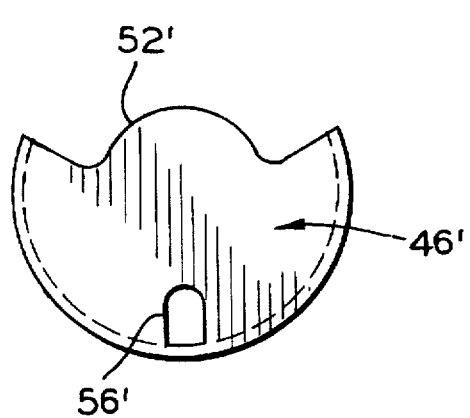
FIG. 8 is a top plan view of a second embodiment of an installation and alignment tool in accordance with this invention.

FIG. 8 illustrates a second embodiment of a bearing cap installation and alignment tool, indicated generally at 46', in accordance with this invention. The second installation and alignment tool 46' includes a larger cutout 52' than the installation and alignment tool 46 discussed above. The larger cutout 52' is large enough to accommodate two protrusions 24 of a bearing cap 18. Thus, only a single aperture 56' is included to accommodate a third protrusion 24.

Figure 9:
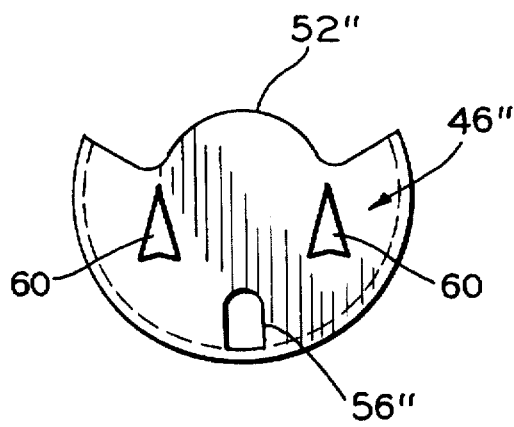
FIG. 9 is a top plan view of a third embodiment of an installation and alignment tool in accordance with this invention.

FIG. 9 illustrates a third embodiment of a bearing cap installation and alignment tool, indicated generally at 46", in accordance with this invention. Like the previous embodiment, the third installation and alignment tool 46" includes a large cutout 52" to accommodate two protrusions 24, and a single aperture 56" to accommodate a third protrusion 24. The third tool 46" additionally includes a pair of printed arrows 60 which can be printed, molded, or provided directly on the third tool 46" to facilitate the usage thereof. If desired, additional indicia, such as printed instructions, can be printed, molded, or otherwise provided on the third tool 46".

Figure 10:
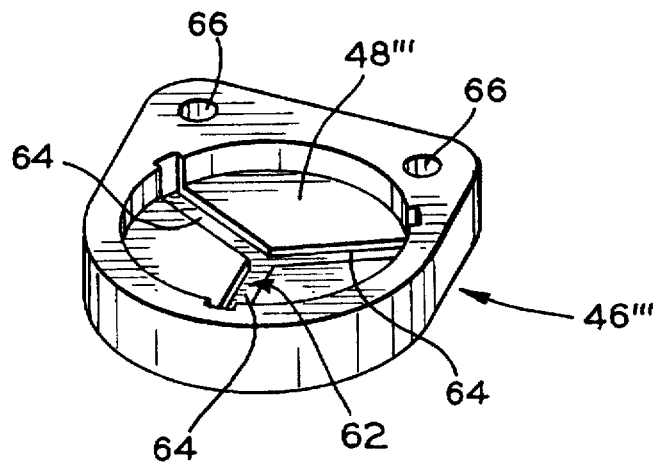
FIG. 10 is a perspective view of a fourth embodiment of an installation and alignment tool in accordance with this invention.

FIG. 10 illustrates a fourth embodiment of a bearing cap installation and alignment tool, illustrated generally at 46'". The fourth tool 46'" includes an inner surface 49'" having a generally Y-shaped groove, indicated generally at 62, formed therein. The groove 62 is formed as three legs 64, each of which starts in the center of the end portion 48'" and extends radially outward at an angle of about 120° relative to one another. The legs 64 of the groove 62 are sized and shaped to received the protrusions 24 of the bearing cap 18 therein. The tool 46''' can also include a pair of apertures 66 formed through the skirt portion 50''' for facilitating the alignment of the fourth tool 46''' relative to the press. It will be appreciated that such apertures 66 may be provided on any of the previously described embodiments.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A method for installing a bearing cap in a universal joint assembly comprising the steps of:

(a) providing a universal joint assembly comprising a yoke including an arm having a cylindrical opening formed therethrough and having a surface formed about said opening, and a cross having an outwardly extending trunnion extending through said opening;

(b) providing a bearing cap including an end surface and an outer cylindrical surface defining an outer diameter;

(c) providing a tool which comprises a body including a generally flat end portion, and a skirt portion having a generally uniform length extending generally perpendicularly from said end portion, wherein said skirt portion has an inner diameter and an inner length, said inner diameter of said skin portion being larger than said outer diameter of said bearing cap, and said inner length of said skirt portion being equal to a predetermined distance by which it is desired that said end surface of said bearing cap be positioned axially outwardly with respect to said outer surface of said yoke arm;

(d) aligning said bearing cap over said trunnion;

(e) aligning said tool over said outer end of said bearing cap such that said end portion of said tool abuts said outer end of said bearing cap; and (f) urging said tool inwardly against said outer end of said bearing cap so that said bearing cap moves inwardly over said trunnion until said skirt portion of said tool engages said surface of said yoke arm, whereby said outer end of said bearing cap is positioned outwardly from said surface of said yoke arm by said predetermined distance.

2. The method defined in claim 1 including the additional step (g) of securing a retainer to said yoke arm to axially retain said bearing cap at said predetermined distance.

3. The method defined in claim 1 wherein said body is generally cup-shaped and includes a generally circular end portion and a generally cylindrical skirt portion.

4. The method defined in claim 1 wherein said tool has a cutout formed in said end portion.

5. The method defined in claim 1 wherein said tool has a cutout formed in said skirt portion.

6. The method defined in claim 1 wherein said tool has cutouts formed in both said end portion and said skirt portion.

7. The method defined in claim 1 wherein said end surface of said bearing cap has an axially extending protrusion formed thereon, and wherein said end portion of said tool has an aperture formed therethrough which receives said protrusion.

8. The method defined in claim 1 wherein said end surface of said bearing cap has a plurality of axially extending protrusions formed thereon, and wherein said end portion of said tool has a plurality of apertures formed therethrough which respectively receive said protrusions.

9. The method defined in claim 1 wherein said end surface of said bearing cap has an axially extending protrusion formed thereon, and wherein said end portion of said tool has a recess formed therein which receives said protrusion.

10. The method defined in claim 1 wherein said end surface of said bearing cap has a plurality of axially extending protrusions formed thereon, and wherein said end portion of said tool has a plurality of recesses formed therein which respectively receive said protrusions.

11. The method defined in claim 1 wherein said tool has indicia provided thereon to facilitate the usage thereof.

12. The method defined in claim 1 wherein said end portion of said tool has a central recess formed therein.

* * * * *